United States Patent [19]
Brown

[11] 3,955,543
[45] May 11, 1976

[54] TWO STROKE CYCLE INTERNAL COMBUSTION ENGINE

[76] Inventor: Arthur E. Brown, 117 E. 5th St., Corning, N.Y. 14830

[22] Filed: Feb. 6, 1974

[21] Appl. No.: 439,988

[52] U.S. Cl. ............................. 123/61 R; 123/61 V; 123/193 CP
[51] Int. Cl.² ........................................ F02B 75/16
[58] Field of Search ............ 123/61 R, 61 V, 193 P, 123/193 CP

[56] References Cited
UNITED STATES PATENTS

| | | | |
|---|---|---|---|
| 1,418,838 | 6/1922 | Setz | 123/61 R |
| 2,780,208 | 2/1957 | Brown | 123/61 R |
| 2,966,887 | 1/1967 | Arnold | 123/41.36 X |
| 3,340,855 | 9/1967 | Brown | 123/61 R |
| 3,340,856 | 9/1967 | Brown | 123/61 R |
| 3,340,857 | 9/1967 | Brown | 123/61 R |

FOREIGN PATENTS OR APPLICATIONS

| | | | |
|---|---|---|---|
| 624,181 | 7/1927 | France | 123/61 R |

*Primary Examiner*—Wendell E. Burns
*Assistant Examiner*—David D. Reynolds

[57] ABSTRACT

A double acting working piston drives a connecting rod and crankshaft. A smaller valve piston is fastened to each end of the working piston. Each valve piston withdraws briefly from its bore so as to introduce scavenge air into a respective annular working chamber. The valve pistons have a centering means and are provided with novel radially restrained piston rings so as to smoothly re-enter their bores without impacting. Other novel features are: inlet nozzle and vanes, rear slide tubes for conducting coolant (such as water) to the pistons, an oil seal which permits the wrist pin to be full floating, and long tie bolts passing through water passages formed in the exhaust port bridges.

22 Claims, 16 Drawing Figures

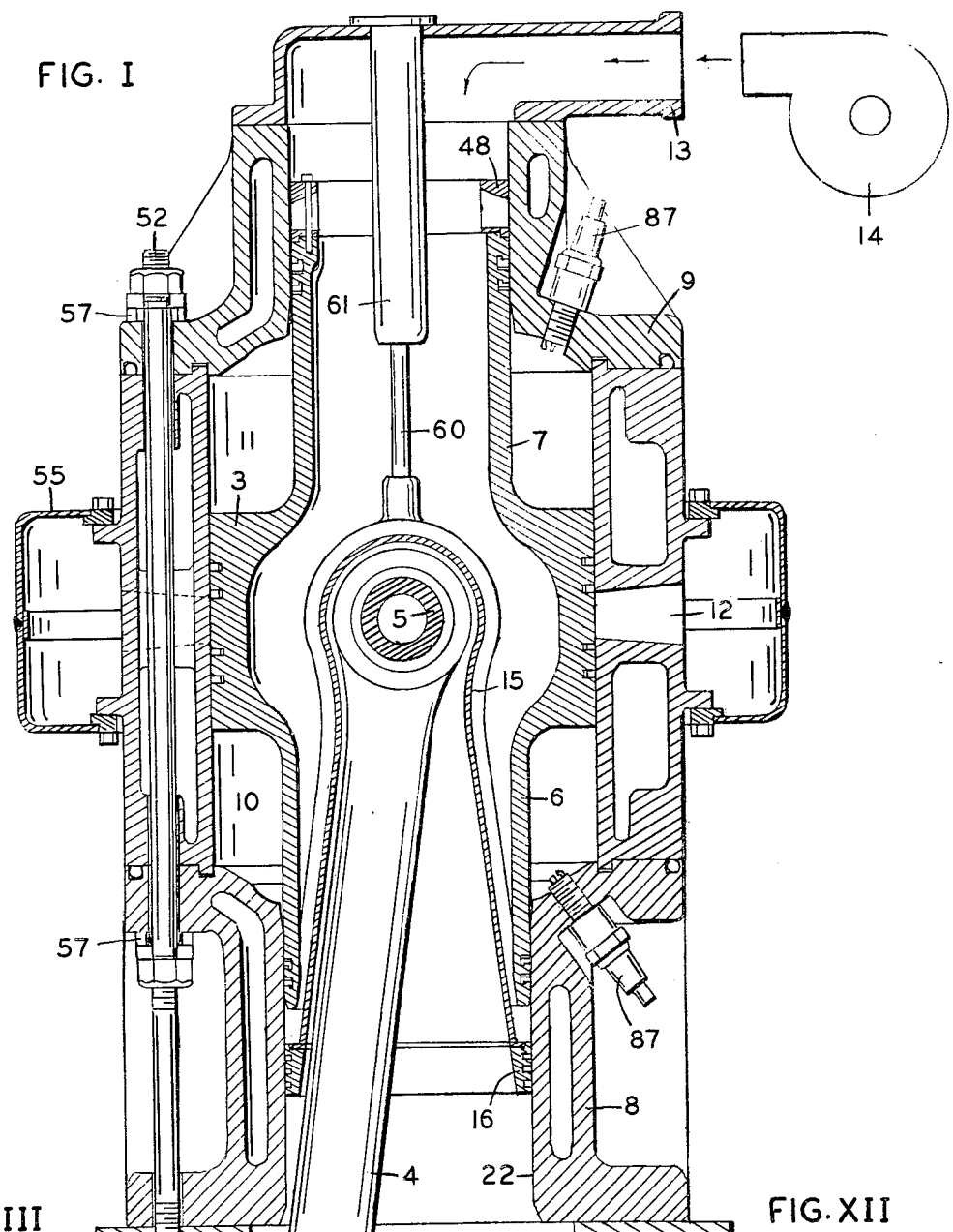
FIG. I
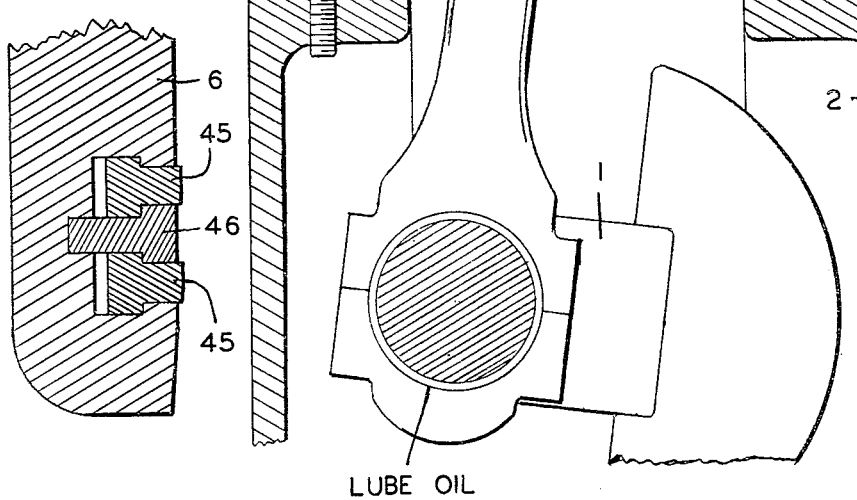
LUBE OIL
FIG. XIII
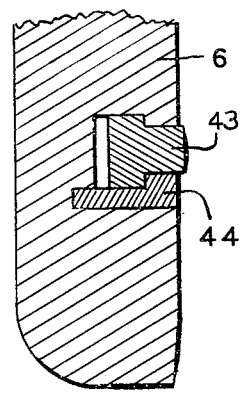
FIG. XII

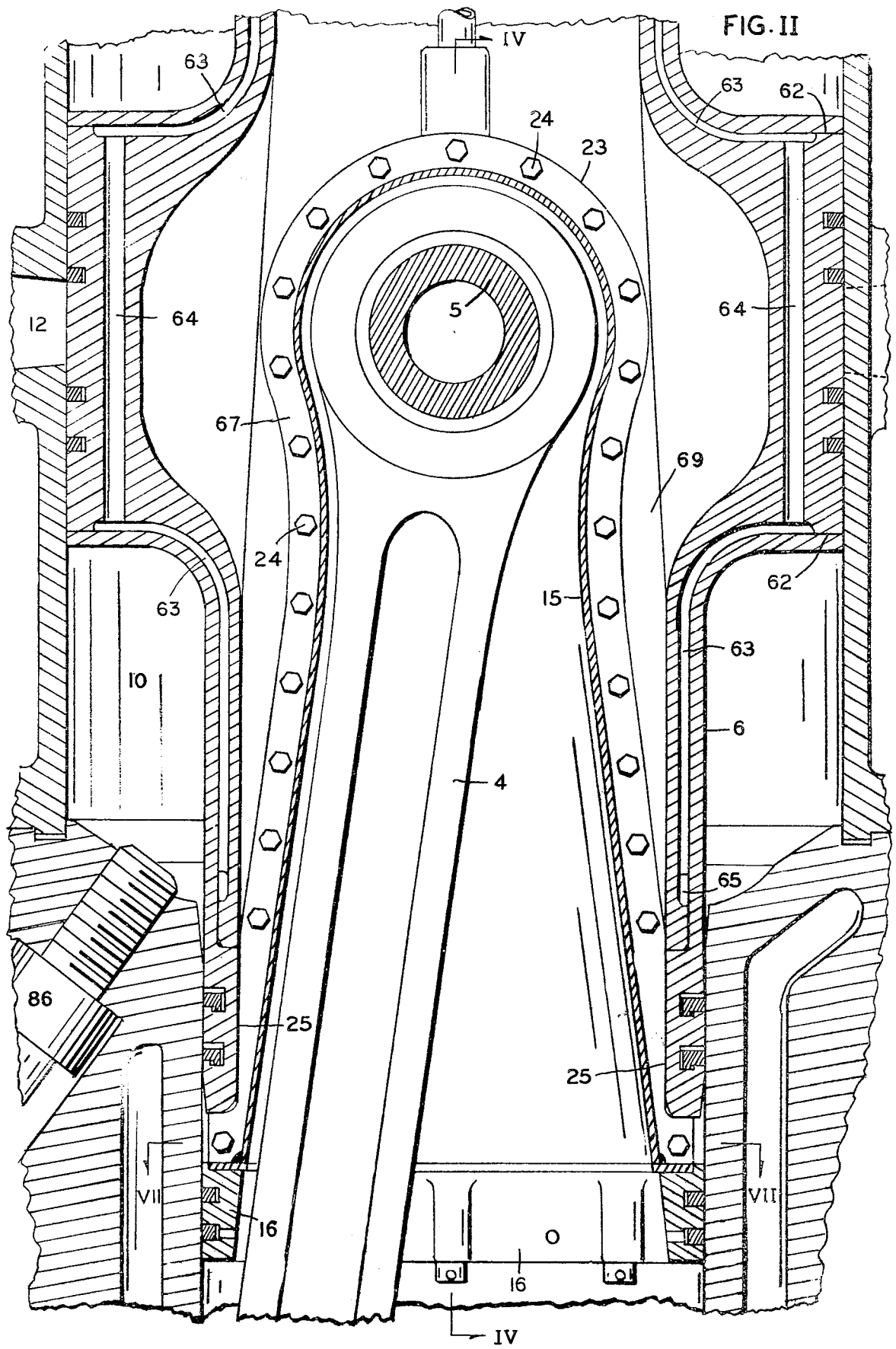
FIG. II

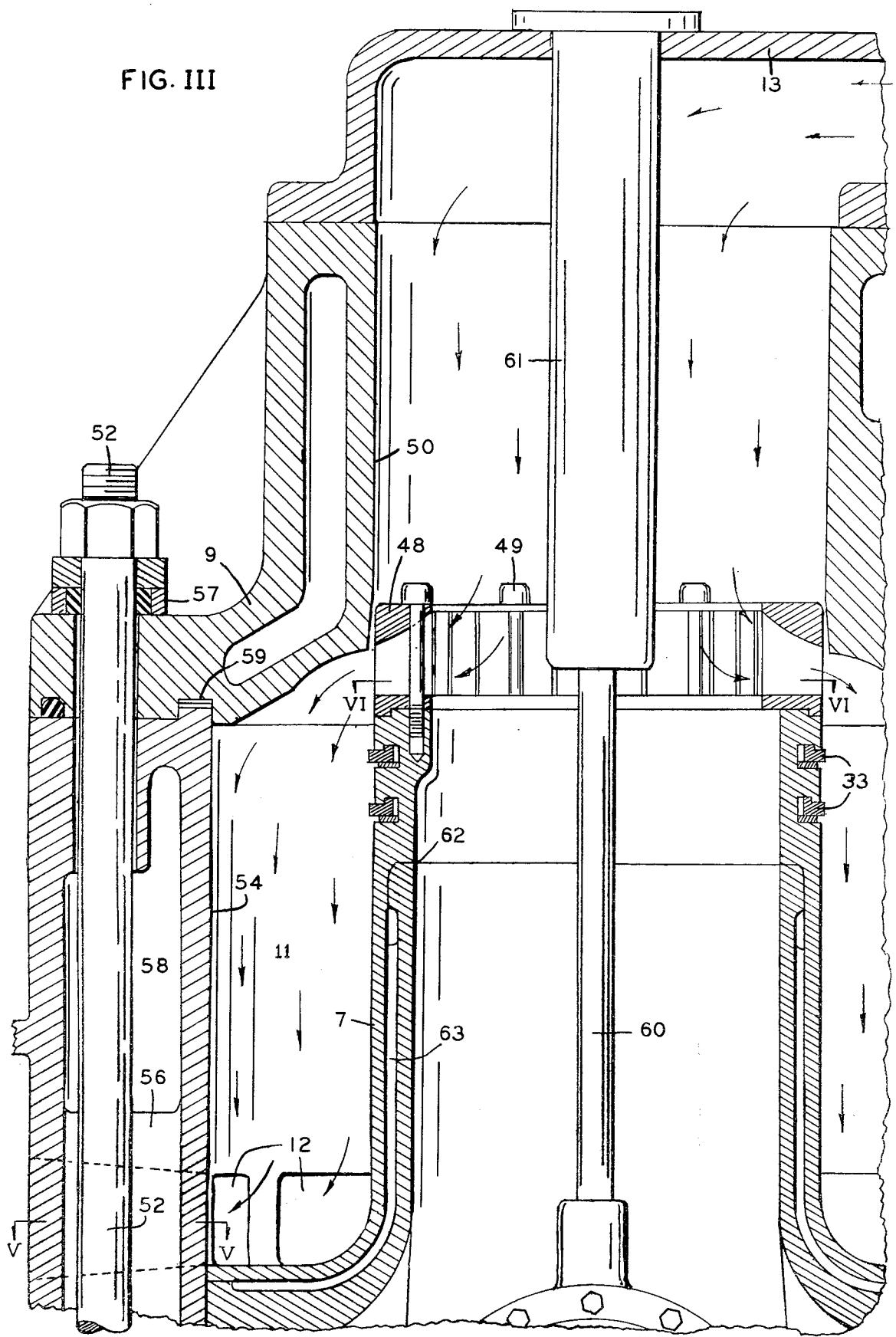

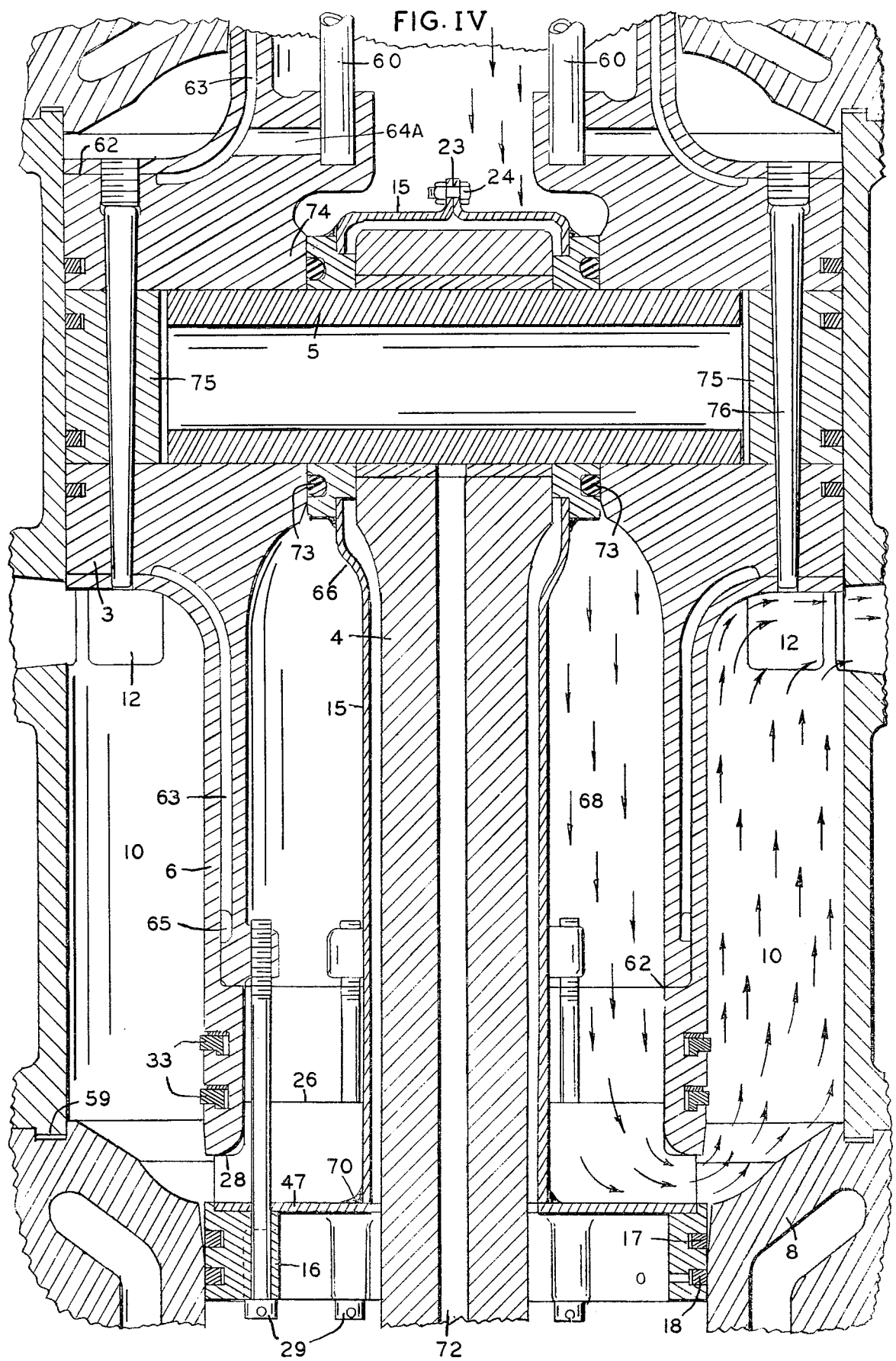
FIG. IV

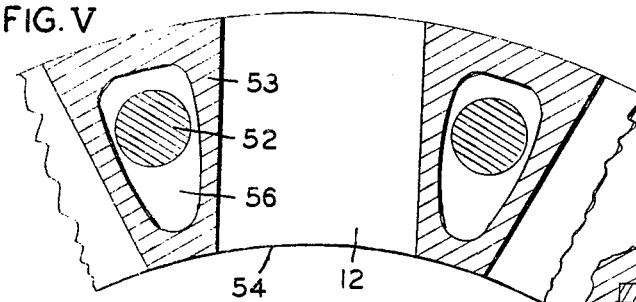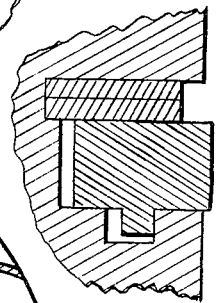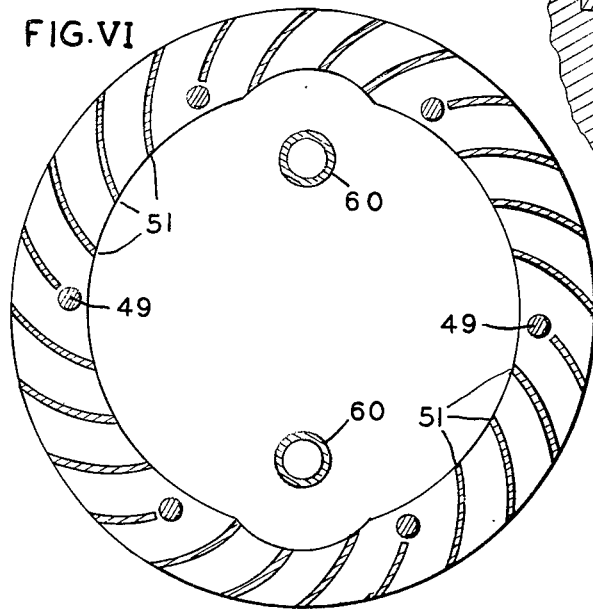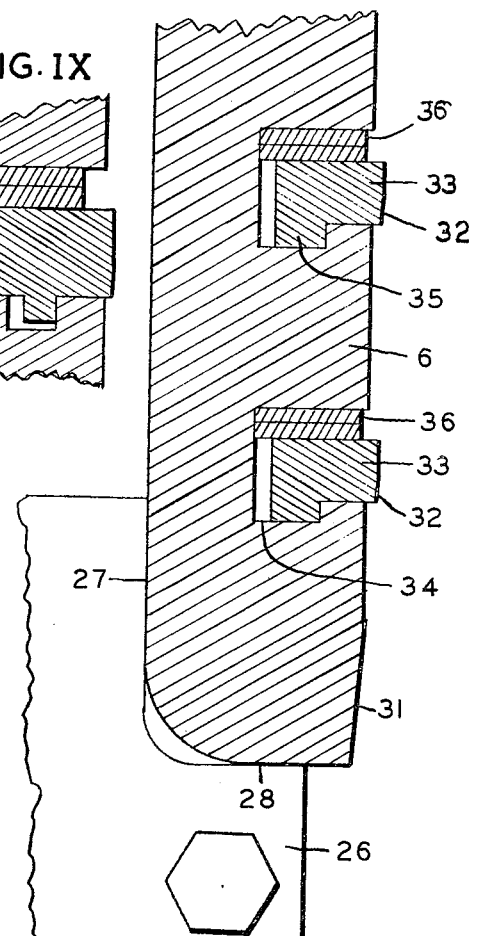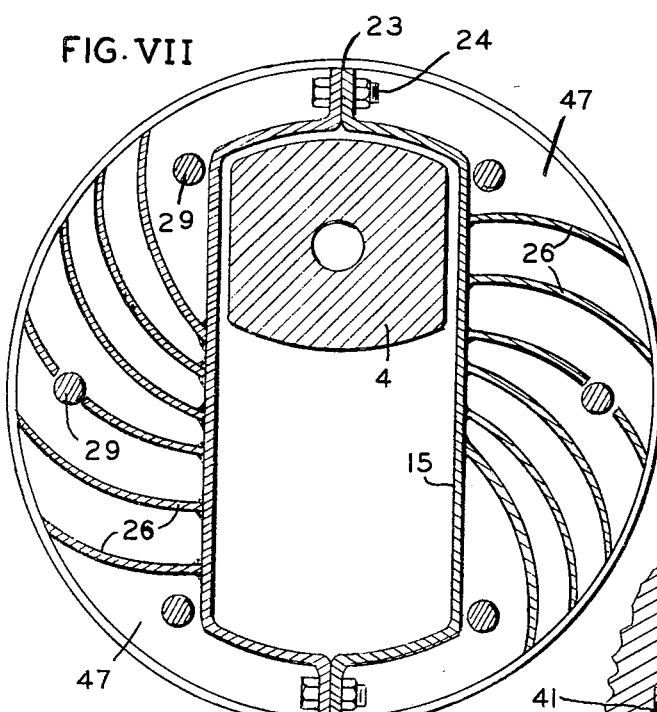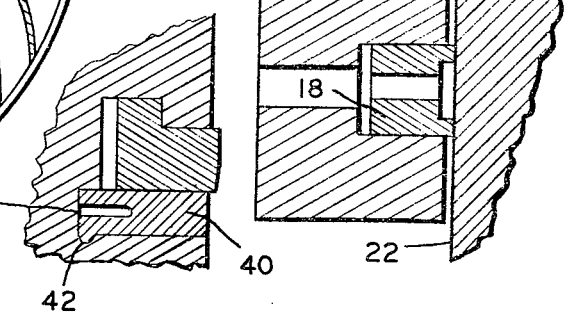

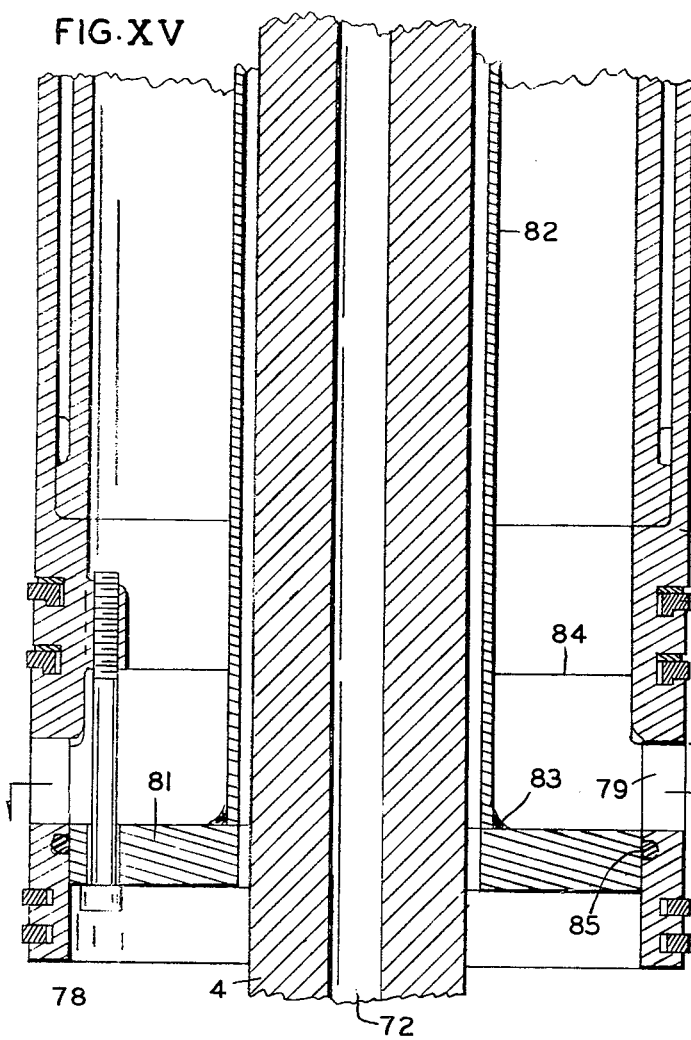
FIG. XV
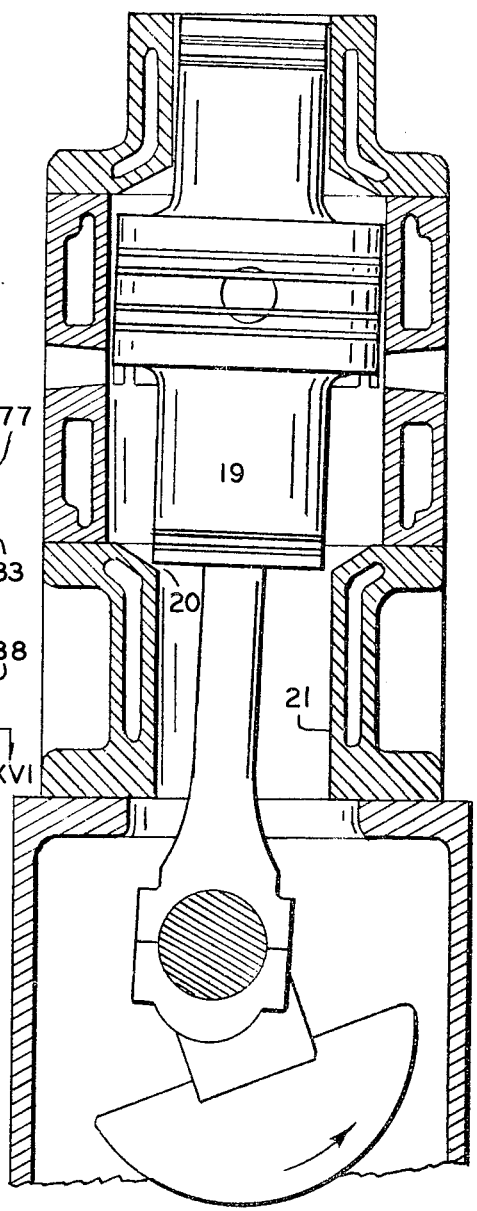
FIG. XIV
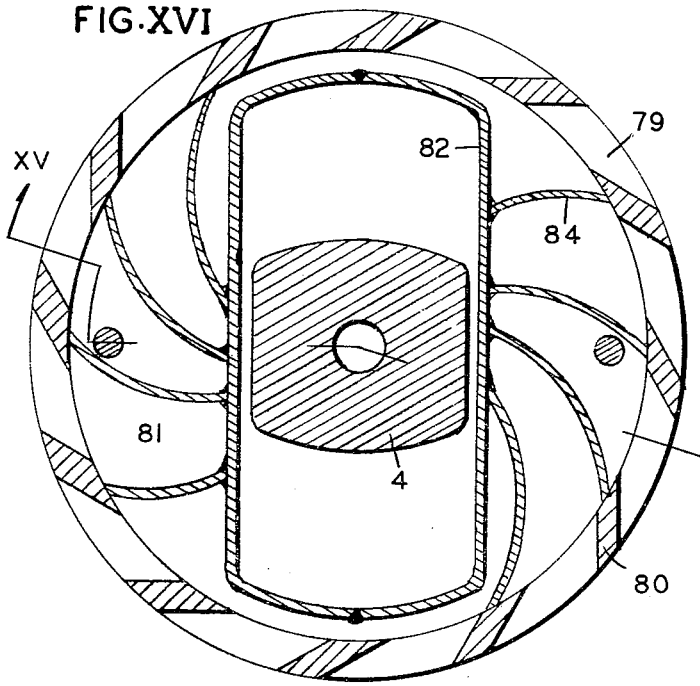
FIG. XVI
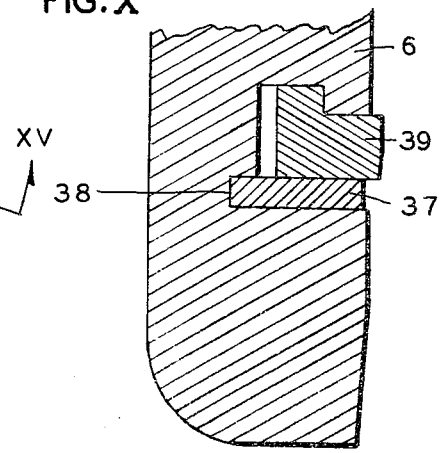
FIG. X

3,955,543

TWO STROKE CYCLE INTERNAL COMBUSTION ENGINE

DISCUSSION OF PRIOR ART

This invention is an improvement on U.S. Pat. Nos. 955,144 (Enderby), 1,902,781 (Isle), and 3,340,855 (Brown). Enderby and Brown have shown inlet ports 8 – 14 and 16 – 17 passing through the walls of thin sleeves which projected directly into the combustion chambers. In a high power engine, such long thin sleeves would be subject to overheating causing burn-out and preignition (in the case of a spark ignition engine).

Isle provided double acting operation in his FIGS. 3 and 18 but required the awkward and disadvantageous Scotch yoke 5 and 32 in order to do so. Isle (in his FIG. 10) used the ordinary crankshaft 7 and connecting rod 85, but in that version, his engine was only single acting (not double acting). Further, in FIG. 10, Isle used inwardly contracting rings 142 (mounted within the cylinder bore) instead of outwardly springing piston rings (carried by the piston). In FIG. 9, Isle showed restrained piston rings 49. However, his arrangement employed a stack up of intermediate rings 51 held in place by a threaded element 52. Those parts were complex and subject to loosening. In FIGS. 3 and 18, Isle did not provide a centering or guidance means to prevent impact as his piston 31 entered bore 30.

OBJECTS OF THIS INVENTION

1. The first object is to provide a double acting uniflow scavenged two stroke cycle internal combustion engine which uses the simple and reliable crankshaft and connecting rod, yet, which does not require a cross head and a cross head guide.

2. Another object is to eliminate the thin overheated sleeves projecting into the combustion chambers as previously described. This object is obtained by arranging for the valve pistons 6 and 7 to withdraw from their bores during scavenging.

3. Another object is to provide a centering means for the valve pistons 6 and 7 so as to prevent impact upon re-entry into their bores.

4. Another object is to provide simpler and more reliable radially restrained piston rings 33 which are capable of withdrawing from and re-entering their bores.

5. An advantage of the construction shown in FIGS. I, IV, and VII is that the scavenge air does not have to pass through ordinary inlet ports formed in a wall or sleeve. Instead, the air passes between the relatively thin sheet metal vanes 26. This means therefore, that a large percentage of the circumference of the valve piston 6 can be devoted to flow area. This in turn leads to a lower height of the inlet port and an increase in power output.

6. Another object is to provide a bigger wrist pin bearing so as to more adequately sustain the loads thereon. Another object is to maximize the flow area at 68 for flow of the scavenge air through the valve piston. These two requirements were previously conflicting. Now both objectives are secured by making the partition member 15 separable and necked down as shown.

7. Another object is to make it possible to water cool the piston 3 in a simple and compact manner. Another related objective is to minimize the danger of the cooling water leaking into the crankcase in case of a slight leakage in transfer to and from the piston. The back mounted slide tubes 60 permit these objectives.

8. The following are several interrelated objectives, (a) to (d), which were previously conflicting but have now been resolved: (a) Provide adequate cooling passages 56 for the exhaust port bridges 53, (b) Keep tension loads off the bridges 53, (c) Provide an exhaust collector ring 55 not penetrated by tie bolts 52, and (d) Locate the tie bolts 52 radially inward for strength and compactness.

9. A novel feature of this invention is the member 48 which performs the three functions of: (a) centering or guidance, (b) circular nozzle, and (c) supports the vanes 51.

10. Another object is to impart a rotational motion to the inlet air so that the air rotates about the axis of the annular working chambers 10 and 11, the purpose of which is to improve scavenging and fuel-air mixing.

BRIEF DESCRIPTION OF THE DRAWINGS

FIG. I is an overall section view of the engine.

FIGS. II through VII are larger scale views of the engine shown in FIG. I and the sections are taken as indicated on the drawings.

FIG. II is slightly modified to show a fuel injector 86 instead of a spark plug 87.

FIG. III shows the piston at the bottom of its stroke.

FIG. IV is a transverse section showing the piston at the top of its stroke.

FIG. V is a partial section showing the water cooled exhaust port bridges 53 and the tie bolts 52.

FIG. VIII is an even larger scale drawing of a portion of FIG. II.

FIGS. IX, X, XI, XII and XIII show alternate types of radially restrained piston rings (drawn to a large scale) for use in the FIG. I engine.

FIG. XIV illustrates by exaggeration how the piston 19 would impact at 20 upon re-entry if not provided with a guidance or centering means.

FIG. XV is a section view (similar to the bottom half of FIG. IV) but showing an alternate valve piston 77 and seal structure 78.

FIG. XVI is a section view taken as indicated in FIG. XV.

Throughout the description and claims, the front of the engine is defined as being nearer the crankshaft than the back.

GENERAL OPERATION OF THE ENGINE

A crankshaft 1 is rotatably mounted in the crankcase or frame structure 2 and is coupled to the working piston 3 by means of the connecting rod 4 and wrist pin 5. A front valve piston 6 and a back valve piston 7 are attached to the working piston 3 so as to form a reciprocating piston assembly or a stepped piston. The front and back valve pistons 6 and 7 momentarily withdraw from their bores in the front and back cylinder heads 8 and 9 so as to admit scavenge air to the front and back annular working chambers 10 and 11. The working piston 3 uncovers the exhaust ports 12 at each end of its stroke so as to provide uniflow type scavenging operations. The arrows in FIGS. III and IV show the flow of gases during scavenging. The arrows have been omitted from the left side of FIG. IV. The words "uniflow scavenge" mean end to end type scavenging wherein the flow of gases in the working chambers is unidirectional in character as opposed to a counterflow pattern. Scavenge air is supplied to the duct 13 by means of a blower 14.

The partition member 15 (made of stamped and welded sheet metal) surrounds the con rod upper end and in cooperation with the seal structure 16 prevents intermixing of scavenge air and lube oil thrown off the crankshaft. These parts also prevent pressurized scavenge air from passing into the crankcase. The seal structure carries a pressure ring 17 (to retain scavenge air) and an oil scraper ring 18 (FIG. IV). The words "LUBE OIL" in FIG. I indicate the presence thereof.

The engine may operate with a carburator (not shown) and spark plugs 87 or the engine may operate on the Diesel cycle using fuel injectors 86. If a carburator is to be used, it would be located either upstream or downstream from the blower 14.

WITHDRAWAL AND RE-ENTRY OF VALVE PISTONS

The valve pistons 6 and 7 are arranged so as to withdraw from their bores near the ends of their stroke so as to admit scavenge air into their respective working chambers 10 and 11. It is imperative that the valve pistons smoothly re-enter their bores each stroke without impacting at the entrance: otherwise, the valve pistons would soon fail. If no centering means or guidance were provided, and the valve pistons were allowed to find their own centers, then the ordinary running clearances between pistons and cylinders would result in an impact of the valve piston upon re-entry. This problem is illustrated by exaggeration in FIG. XIV in which the unguided piston 19 is shown to impact at 20 upon its re-entry into bore 21. Even a small impact would be undesirable considering the millions of cycles that an engine piston must operate.

The above described problem has been resolved by employing the seal structure 16 to help center the valve piston 6 so as to prevent impact upon re-entry into bore 22. The seal structure 16 is able to do this because it does not withdraw from bore 22.

In FIGS. II and IV, the partition member 15 is made in two parts and is fastened together by means of the flanged joint 23 and bolts 24. The edge of the flanged joint is ground at 25 so as to fit tightly at 25 inside the front valve piston 6. Also the sheet metal vanes 26 are ground at 27 and 28 (FIGS. IV and VIII) so as to fit tightly against the inside and end of the front valve piston 6. The bolts 29 hold the seal structure 16 and vane/partition member assembly tightly against and inside the front valve piston for a concentric and rigid assembly. Thus the valve piston 6 is assured of a centered re-entry into its bore 22 each time. In FIG. VIII, 5° tapers on radius (10° on diameter) are provided at 30, 31, and 32 to ease re-entry.

To summarize, the partition member 15 and seal structure 16 perform three functions which are: (1) They prevent mixing of scavenge air and crankcase lube oil, (2) they prevent pressurized scavenge air from passing into the crankcase, and (3) they help (along with the vanes 26 and bolts 29) to center the front valve piston 6 for re-entry into its bore 22. All this is done with a minimum of flow restriction as the scavenge air must be able to pass freely from inside the front valve piston into chamber 10 as shown in FIG. IV.

RADIALLY RESTRAINED PISTON RINGS

FIGS. III, IV, and VIII illustrate that the piston rings 33 withdraw from their bores each reciprocative stroke. Provision must also be made for their smooth re-entry. Referring to FIG. VIII, the piston rings 33 are radially restrained so as to have a limited amount of radial expansion upon withdrawal from their bore 22. The ring groove has an undercut 34. The piston rings 33 have a lip 35 engaging the undercut so as to limit the radial expansion. The piston rings 33 are installed by springing over the piston 6 and then sliding axially in place after being depressed into their grooves. Retaining rings 36 retain the piston ring 33 in axial position. The retaining rings 36 have two turns and a crimp for flatness. In the views, the amount of radial expansion of the piston rings is exaggerated for illustrative purposes. The amount of such radial expansion need be only sufficient to allow for wear, eccentricity, and piston to bore running clearance.

In FIG. X, the retaining ring 37 is pressed radially with a press fit into a sub groove 38 after installation of piston ring 39. The retaining ring 37 may be a single piece with a single split, or it could be of several segments.

In FIG. XI, the retaining ring 40 has a slot 41 (for springing into place) and a slight lip 42 for retention.

In FIG. XII, the symmetrical piston ring 43 has a lip on both sides. The ring is restrained twice with the undercut in the piston plus the retaining ring 44 also serves to restrain the piston ring. The retaining ring 44 is pressed tightly into a sub groove at its radially inward portion.

FIG. XIII is similar to FIG. XII except two piston rings 45 are locked in place by one double lipped retaining ring 46.

DESCRIPTION OF FRONT VANES 26

In FIGS. IV and VII, the partition member consists of the plates 47 and sides 15. The sheet metal vanes 26 are welded to same. The vanes serve to hold the seal structure 16 in rigid coaxial alignment with the front valve piston 6 (as previously described) so as to assure smooth re-entry of the valve piston 6 into bore 22 each reciprocative stroke.

In addition to the centering and holding function just described, the vanes 26 also serve to impart a rotational motion to the inlet air (about the cylinder axis) so as to improve scavenging and fuel-air mixing.

The FIG. IV engine does not have a series of inlet ports formed in a cylinder wall. Instead, the inlet air is introduced by virtue of the fact that the valve piston 6 completely withdraws from its bore so that scavenge air may pass under the end of the valve piston. The sheet metal vanes 26 are relatively thin (compared to ordinary inlet port bridges) and thus the inlet flow area is maximized. This leads to a longer working stroke.

To summarize, the vanes 26 perform three functions which are: (1) They help to hold the valve piston 6 and seal structure 16 in rigid spaced coaxial alignment, (2) They provide easy passage for the inlet air between the vanes, and (3) They impart a rotational motion to the inlet air.

DESCRIPTION OF GUIDE — NOZZLE 48 AND BACK VANES 51

In FIG. III, the member 48 is bolted 49 to the top of the back valve piston 7 and performs three separate functions which are described as follows: (*a*) The member 48 rides inside bore 50 and therefore serves as a guidance member to hold the valve piston 7 in coaxial alignment with bore 50 so as to facilitate re-entry of the valve piston into the bore without impact each reciprocative stroke; (b) The member 48 also serves as an annular nozzle so as to increase the flow of scavenge air into the back working chamber 11. The entrance area exceeds the exit area; and (c) The member 48 supports the vanes 51 (also see FIG. VI) which impart rotation to the inlet air, so as to improve scavenging and fuel-air mixing.

TIE BOLTS 52 AND BRIDGES 53

Referring to FIGS. III and V, the working cylinder 54 has exhaust ports 12 located all the way around. An exhaust port bridge 53 is located between each exhaust port. The band of exhaust port bridges (FIG. V) therefore constitutes the weakest part of the cylinder structure since so much metal is removed for porting. Cast iron is weak in tension but very strong in compression. Therefore, the long steel tie bolts (or tension rods) 52 are provided to keep tension loads (due to firing forces) out of the exhaust port bridges 53. It is desirable that the circle of the bolts 52 be located radially inward to prevent dishing of the cylinder heads 8 and 9 and also to make the overall engine more compact. Further, it would be quite undesirable to pass the tie bolts through the exhaust collector ring 55 (FIG. I).

The exhaust ports 12 serve two working chambers 10 and 11 hence they receive a double heating effect. Therefore, it is necessary to provide adequate water cooling passages 56 through the bridges to prevent heat failure. The above conflicting requirements have been resolved by passing the tie bolts 52 directly through the coolant passages 56 as shown in FIGS. I, III, and V. Static seals are provided at 57 to prevent leakage of coolant from the water jacket 58. A confined gasket 59 seals both cylinder gas pressure and water.

COOLING THE PISTONS

It is necessary to provide adequate cooling for the pistons (particularly in a large double acting engine) so as to prevent heat failure. Water has the following advantages over lube oil for cooling the piston:
1. The specific heat is 1 instead of 0.48.
2. Water can take a higher temperature rise, to say, 200°F instead of to 170°F for oil. Common lube oil tends to break down if heated to temperatures over 170°F.
3. The density of oil is 0.85 that of water.
4. Because of items 1 to 3 above, the volume flow rate of water (instead of oil) would be $0.48/1 \times 2 F/50F \times 0.85/1 = 16\%$. This makes the conducting and passage through the piston much easier.
5. The thermal conductivity of water is 4.5 times that of oil thus better heat transfer.
6. The kinematic viscosity of SAE 30 oil at 120°F is 87 times that of water at the same temperature. Less pressure drop for water.
7. No danger of overheated oil coking in small passages in the piston.

Irregardless of the above advantages, water has not been widely used to cool pistons in general on account of the difficulty of conducting water to and from a reciprocating piston and the danger of water leaking into the crankcase (to mix with the lube oil). This problem has been solved by the provision of the slide tubes 60 and packing glands 61 with their unique location inside the back valve piston 7. With such an arrangement, the pistons can be water cooled; yet, if a small amount of water leakage (out of gland 61) should occur, then such leakage would pass harmlessly with the scavenge air into the working chambers 10 and 11, and not into the crankcase 2. Also, such a location for the tubes 60 does not interfere with the crankshaft and con rod nor does it increase the overall size of the engine. The glands 61 are readily accessable for maintenance.

The piston assembly is a composite structure consisting of outer shells brazed at 62 to an inner shell structure. Channels 63 and drilled holes 64 are for flow of the liquid coolant. Cross over slots 65 interconnect the ends of adjacent channels for return flow.

Referring to FIGS. I and IV, there are two tubes 60 and two packing glands 61. Each tube reciprocates within its respective packing gland. Water enters at the top of one packing gland (FIG. I). The water is then conducted to the reciprocating piston assembly via one gland 61 and slide tube 60. The water exits via the second slide tube and second packing gland. In FIG. IV, the cooling water may enter the piston assembly via the left tube 60 and exit via the right tube 60 or vice versa.

Referring to FIG. IV, the cooling water may pass down through the left tube 60, pass through a horizontal drilled hole 64A to a channel 63. The channels 63 are cast into the outer surface of an inner shell structure. As shown in FIG. II, the cooling water flows through drilled holes 64 from channels 63 in the back part of the piston assembly to similar channels 63 in the front part of the piston assembly.

SEPARABLE PARTITION 15 PERMITS LARGER WRIST PIN AND BEARING

It is desirable to provide a large wrist pin 5 and bearings therefore in order to adequately sustain the loads thereon. In FIG. II and IV the partition member 15 encloses the top end of the con rod 4. The partition member is necked down at 66 and 67 in order to provide more flow area at 68 and at 69 for the scavenge air. Since the partition member 15 is necked down as described, it is necessary to make the partition member separable in order to assemble the con rod 4 inside of it. The flange joint 23 permits pressing the two halves from sheet stock and does not interfere with the flow of scavenge air. The edges of the flange are ground at 25 so as to fit tightly at 25 inside the inner diameter of the front valve piston 6, the purpose of which is to provide an alignment or centering function between the seal structure 16 and the front valve piston 6.

The circular plate 47 is part of the partition member and is welded at 70 to the sides of same. The plate 47 is also separable into two pieces. The seal structure 16 is centered at 71 (FIG. VIII) on the turned periphery of the plate 47. The cast seal structure 16 is not split in two pieces.

To summarize, the partition member 15 with its plate member 47, and the seal structure 16 perform several functions which are; (1) They prevent lube oil thrown off the crankshaft from passing out with the scavenge air, (2) They prevent the flow of pressurized scavenge air into the crankcase, (3) They maintain the front valve piston 6 in coaxial alignment with its bore 22 in order to facilitate smooth re-entry upon each return stroke, and (4) the separable partition member permits a large wrist pin and bearing, yet, is necked down to increase the flow area at 68 and 69 for scavenge air.

FULL FLOATING WRIST PIN WITH STATIC OIL SEAL

In FIG. IV, the wrist pin 5 is full floating. That is, the wrist pin can rotate relative to both the connecting rod 4 and the working piston 3 — a desirable feature. The wrist pin bearings must be lubricated and this is provided in the usual fashion via a drilled hole 72 in the con rod 4. Elastomeric seal rings 73 prevent leakage of the lube oil to the scavenge air. A feature of the seals 73 is that they are static. That is, there is no relative motion between the adjacent parts being sealed so as to cause wear and leakage of the seals. This is an improvement over the seal 33 in U.S. Pat. No. 3,340,855.

The various parts are assembled as follows: First, the partition member 15 is assembled with the con rod 4 inside same. Next, the rubber 0 rings 73 are placed in their grooves and the whole assembly slid up into the piston 3. The bosses 74 are faced and beveled for ease of installation.

The plugs 75 are held in place by the taper pins 76.

ALTERNATE DESIGN — FIGS. XV AND XVI

The front valve piston 77 and seal structure 78 are an integral casting and the inlet ports 79 pass through the wall of the casting. The front valve piston 77 and the seal structure 78 are thus interconnected by the lands 80 which are located between the ports 79. The steel plate 81 is part of the partition member 82 and is welded at 83 to the sides thereof. The vanes 84 are welded to the partition member. The vanes 84 are slanted so as to assist the slanted ports 79 to impart rotation to the inlet air. At 85 is a rubber seal ring. For the purpose of the claims, the valve piston 77 ends at edge 88 where the lands 80 and ports 79 begin. The valve piston 77 withdraws from its bore once the edge 88 withdraws.

MODIFICATIONS NOT SHOWN

In the drawings and description, the cylinders are shown and described as being circular in cross section. The claims are not to be avoided by making the cylinders of a different cross section. An eccentric shaft would be equivalent to a crankshaft.

If the seal structure 78 were omitted, and the lands 80 extended in length so as to serve as guidance members (for re-entry of the valve piston), they would be so considered. Integral lands (similar to 80) could also be applied to the back valve piston 7 (instead of member 48), for the purpose of guidance during re-entry of the valve piston 7.

Unless specified otherwise (in a claim), a valve piston can be sealed with either an expanding type piston ring (as shown) or with a contracting seal ring mounted in a cylinder head.

Several of the novel features disclosed herein are applicable to a single acting engine.

While the preferred embodiments of the invention have been described, it will be understood that the invention is not limited thereto since it may be otherwise embodied within the scope of the following claims:

I CLAIM:

1. In a two stroke cycle internal combustion engine, the combination of a crankcase, a crankshaft rotatably mounted in said crankcase, a working cylinder fastened to said crankcase, a front cylinder head and a back cylinder head fastened to said working cylinder, each cylinder head having a reduced diameter bore therein, a double acting working piston reciprocable in said working cylinder, a reduced diameter front valve piston and a reduced diameter back valve piston, said two valve pistons being attached to said working piston so as to form a reciprocating piston assembly, each valve piston being reciprocable in the bore of its respective cylinder head, a connecting rod interconnecting said working piston and said crankshaft, said connecting rod being connected to said working piston by means of an articulative joint, said working cylinder having exhaust ports located in its wall, said working piston being adapted to uncover said exhaust ports near the end of each reciprocative stroke, a scavenge pump for supplying scavenge air, a conduit means interconnecting said scavenge pump and said back cylinder head so as to conduct the scavenge air from the scavenge pump to the interior of said bore in the back cylinder head, said working cylinder having within it an annular front working chamber and an annular back working chamber, said valve pistons being adapted to momentarily withdraw from the bores in their respective cylinder heads near the end of a reciprocative stroke for the purpose of admitting scavenge air into their respective working chambers so as to scavenge the working chambers, each working chamber having a uniflow type scavenging operation wherein the scavenge air enters one axial end of the working chamber and the exhaust gas exits through said exhaust ports at the other axial end of the working chamber, said front valve piston having a ring groove formed in its outer cylindrical surface, a piston ring located in said ring groove, said piston ring being adapted to expand radially outward and seal against the wall of said bore in the front cylinder head, wherein the improvement comprises; said front valve piston and said piston ring both being adapted to withdraw from said bore in the front cylinder head during part of their reciprocative stroke for the purpose of admitting scavenge air into said front working chamber, a guidance member attached to said front valve piston and reciprocable therewith, said guidance member being reciprocable within said bore in the front cylinder head, said guidance member remaining inside said bore in the front cylinder head during that portion of time when the front valve piston and said piston ring are withdrawn from said bore, said guidance member serving to hold said front valve piston in alignment for re-entry into said bore in the front cylinder head, said engine being double acting and using said crankshaft and said connecting rod, said connecting rod passing through said front valve piston, and said connecting rod passing through said piston ring.

2. The combination recited in claim 1 wherein said ring groove has an undercut in the side wall of the ring groove, said piston ring has a lip formed on a side of the piston ring, said lip engages said undercut so as to limit the radial expansion of said piston ring upon its withdrawal from said bore in the front cylinder head, and the purpose of limiting the radial expansion of the piston ring is to facilitate re-entry of the piston ring into said bore in the front cylinder head.

3. The combination recited in claim 2 wherein the entrance to said bore in the front cylinder head is provided with a tpaered entrance for the purpose of facilitating the re-entry of said piston ring into the bore, and said tapered entrance has a taper of less than 7 degrees, on a radius, said 7 degrees is the measured angle between the axis of the bore in the front cylinder head and a line lying on the conical surface of the taper; and said axis and said line both lie in 4. In a two stroke cycle internal combustion engine, the combination of a crankcase, a crankshaft rotatably mounted in said crankcase, a working cylinder fastened to said crankcase, a cylinder head fastened to the back end of said working cylinder, said cylinder head having a reduced diameter bore therein, a working piston reciprocable in said working cylinder, a reduced diameter valve piston fastened to the back end of said working piston so as to form a reciprocating piston assembly, said valve piston being reciprocable in said bore in the cylinder head, a connecting rod interconnecting said working piston and said crankshaft, said connecting rod being connected to said working piston by means of an articulative joint, said working cylinder having exhaust ports located in its wall, said working piston being adapted to uncover said exhaust ports near the end of a reciprocative stroke, a scavenge pump for supplying scavenge air, conduit means interconnecting said scavenge pump and said cylinder head so as to conduct the scavenge air from the scavenge pump to the interior of said bore in the cylinder head, said working cylinder having within it an annular working chamber, said valve piston being adapted to momentarily withdraw from said bore in the cylinder head near the end of a reciprocative stroke for the purpose of admitting scavenge air into said annular working chamber so as to scavenge the annular working chamber, said working chamber having a uniflow type scavenging operation wherein the scavenge air enters one axial end of the working chamber and the exhaust gas exits through said exhaust ports at the other axial end of the working chamber, said valve piston having a ring groove formed in its outer cylindrical surface, a piston ring located in said ring groove, said piston ring being adapted to expand radially outward and seal against the wall of said bore in the cylinder head, said valve piston and said piston ring being adapted to withdraw from said bore in the cylinder head during part of their reciprocate stroke so as to admit scavenge air into said annular working chamber, said piston ring being radially restrained so as to have a limited amount of radial expansion upon its withdrawal from said bore in the cylinder head,
  wherein the improvement comprises; a guidance member attached to and reciprocable with said valve piston, said guidance member being reciprocable within said bore in the cylinder head, said guidance member being axially spaced from the end of said valve piston such that scavenge air may flow between the end of the valve piston and said guidance member, said guidance member remaining inside said bore in the cylinder head during that portion of time when said valve piston and its piston ring are withdrawn from said bore, and said guidance member serving to hold said valve piston in alignment for re-entry of both the valve piston and its piston ring into said bore in the cylinder head.

5. The combination recited in claim 4 wherein vanes are located between the end of said valve piston and said guidance member, said vanes are inclined at an angle relative to the circumference of said valve piston, said vanes serve to impart a rotational motion to the scavenge air as it flows between the end of the valve piston and said guidance member, and said rotational motion being around the axis of said annular working chamber.

6. The combination recited in claim 5 wherein said guidance member also serves as an annular flow nozzle for facilitating the flow of scavenge air into the annular working chamber, said nozzle has more flow area at its entrance than at its exit.

7. In a two stroke cycle internal combustion engine, the combination of a working cylinder, a cylinder head fastened to said working cylinder, said cylinder head having a reduced diameter bore therein, a working piston reciprocable in said working cylinder, a reduced diameter valve piston fastened to said working piston, said valve piston being reciprocable in said bore in the cylinder head, said working cylinder having exhaust ports located in its wall, said working piston being adapted to uncover said exhaust ports near the end of a reciprocative stroke, means for supplying scavenge air, said working cylinder having within it an annular working chamber, said valve piston being adapted to control the flow of scavenge air into said working chamber, said working chamber having a uniflow type scavenging operation exhausting through said exhaust ports, said valve piston having a ring groove located in its outer cylindrical surface, a piston ring located in said ring groove, said piston ring being adapted to expand radially outward and seal against the wall of said bore in the cylinder head,
  wherein the improvement comprises;
    said piston ring being adapted to withdraw from said bore in the cylinder head during part of its reciprocative stroke, said ring groove having an undercut in the side of the ring groove, said piston ring having a lip formed on a side of the piston ring, said lip engaging said undercut so as to limit the radial expansion of said piston ring upon its withdrawal from said bore in the cylinder head, the purpose of radially restraining the piston ring being to facilitate re-entry of the piston ring into said bore upon the return stroke of said valve piston, a retaining ring placed in the same groove as said piston ring, and said retaining ring serving to hold said piston ring in axial position in said groove so as to prevent disengagement of said lip from said undercut.

8. The combination recited in claim 7 wherein a guidance member is attached to said valve piston and reciprocates therewith, said guidance member is reciprocable within said bore in the cylinder head, said guidance member remains inside said bore in the cylinder head during that portion of time when said valve piston and said piston ring are withdrawn from said bore, and said guidance member serves to hold said valve piston in alignment for re-entry into said bore in the cylinder head.

9. The combination recited in claim 8 wherein vanes are located between the end of said valve piston and said guidance member, said vanes reciprocate with the valve piston and the guidance member, and said vanes serve to impart a rotational motion to the scavenge air as it flows between the vanes.

10. The combination recited in claim 7 wherein a guidance member is attached to said valve piston and reciprocates therewith, said guidance member is reciprocable within said bore in the cylinder head, said guidance member remains inside said bore in the cylinder head during that portion of time when said valve piston and said piston ring are withdrawn from said bore, said guidance member holds said valve piston in alignment with said bore so as to facilitate re-entry of the valve piston into said bore, vanes located between the end of said valve piston and said guidance member, said vanes reciprocate with the valve piston and the guidance member, said vanes impart a rotational motion to the scavenge air as it flows between the vanes, said guidance member also serves as an annular flow nozzle for facilitating the flow of scavenge air into said annular working chamber, and said nozzle has more flow area at its entrance than at its exit.

11. In a double acting two stroke cycle internal combustion engine, the combination of a crankcase, a crankshaft rotatably mounted in said crankcase, a working cylinder fastened to said crankcase, a front cylinder head and a back cylinder head fastened to said working cylinder, each cylinder head having a reduced diameter bore therein, a double acting working piston reciprocable in said working cylinder, a reduced diameter front valve piston and a reduced diameter back valve piston, said two valve pistons being attached to said working piston so as to form a reciprocating piston assembly, each said valve piston being reciprocable in the bore of its respective cylinder head, a connecting rod interconnecting said piston assembly and said crankshaft, said connecting rod being connected to said piston assembly by means of an articulative joint, said working cylinder having exhaust ports located in its wall, said working piston being adapted to uncover said exhaust ports near the end of each reciprocative stroke, means for supplying scavenge air, said working cylinder having within it an annular front working chamber and an annular back working chamber, said valve pistons being adapted to control the flow of scavenge air into said annular working chambers so as to scavenge same, each working chamber having a uniflow type scavenging operation exhausting through said exhaust ports, a piston ring mounted on and carried by said front valve piston, said piston ring being adapted to reciprocate within said bore in the front cylinder head, said piston ring being adapted to expand radially outward and seal against the wall of said bore in the front cylinder head, a partition member reciprocable with and located inside said piston assembly, said partition member partly surrounding said connecting rod, a seal structure reciprocable within said bore in the front cylinder head and forming a sliding seal therein, said crankchaft being adapted to be lubricated with lube oil, said partiton member and said seal structure serving to inhibit the intermixing of said scavenge air and said lube oil, wherein the improvement comprises: said front valve piston and said piston ring both being adapted to withdraw from said bore in the front cylinder head during part of their reciprocative stroke for the purpose of admitting scavenge air into said front working chamber, said seal structure remaining inside said bore in the front cylinder head during that portion of time when the front valve piston and said piston ring are withdrawn from said bore, said seal structure also performing a second function which is to hold said front valve piston in substantial alignment for re-entry into said bore in the front cylinder head and said seal structure being rigidly interconnected to the front valve piston for this purpose, said engine being double acting and using said crankshaft and said connecting rod, said connecting rod passing through said front valve piston, said connecting rod passing through said piston ring, and said connecting rod passing through said seal structure.

12. The combination recited in claim 11 wherein said piston ring is located in a ring groove formed in the outer cylindrical surface of said front valve piston, said ring groove has an undercut formed in a side wall of the groove, said piston ring has a lip formed on a side of the piston ring, said lip engages said undercut so as to limit the radial expansion of said piston ring upon its withdrawal from said bore in the front cylinder head, the purpose of limiting the radial expansion of said piston ring is to facilitate re-entry of the piston ring into said bore upon the return stroke of said front valve piston, a retaining ring placed in the same groove as said piston ring, and said retaining ring serves to hold said piston ring in axial position in said groove so as to prevent disengagement of said lip from said undercut.

13. The combination recited in claim 11 wherein: sheet metal vanes are attached to said partition member and project radially outward therefrom, said vanes engage said front valve piston so as to assist in maintaining said rigid interconnection between the front valve piston and said seal structure, bolt members passing from said seal structure to the front valve piston for the purpose of maintaining said rigid interconnection, and said scavenge air is adapted to flow between said vanes on its way into said front working chamber.

14. The combination recited in claim 11 wherein: said partition member is rigidly fastened to said seal structure, said partition member engages said front valve piston so as to assist in maintaining said rigid interconnection between said front valve piston and said seal structure.

15. The combination recited in claim 11 wherein vanes are located between said front valve piston and said seal structure, and said vanes serve to impart a rotational motion to the scavenge air as it flows between the end of said front valve piston and said seal structure.

16. The combination in a double acting two stroke cycle internal combustion engine of a frame structure, a crankshaft rotatably mounted in said frame structure, a working cylinder fastened to said frame structure, a front cylinder head and a back cylinder head fastened to said working cylinder, each cylinder head having a reduced diameter bore therein, a double acting working piston reciprocable in said working cylinder, reduced diameter front and back valve pistons attached to said working piston so as to form a reciprocating piston assembly, each valve piston being reciprocable in the bore of its respective cylinder head, a connecting rod interconnecting said piston assembly and said crankshaft, said working cylinder having exhaust ports controlled by the working piston, a scavenge pump for supplying scavenge air, conduit means for conducting said scavenge air from said scavenge pump to the interior of said bore in the back cylinder head, said working cylinder having within it annular front and back working chambers where combustion and expansion of hot combustion gases take place forming a hot gas environment, said annular working chambers being bounded on their outer diameters by said working cylinder, said annular working chambers being bounded on their inner diameters by said valve pistons, said annular working chambers being bounded at their axial ends by said cylinder heads and said working piston, each valve piston being adapted to admit scavenge air to its respective annular working chamber, said working chambers having uniflow type scavenging operations exhausting through said exhaust ports, said piston assembly having passages within a shell structure for passage of liquid coolant, wherein the improvement comprises; a slide tube and a packing gland for conducting liquid coolant to said piston assembly, said slide tube being reciprocable inside said packing gland, (said slide tube is hereby referred to as a coolant transfer member, said packing gland is also hereby referred to as a coolant transfer member,) one of said coolant transfer members being fastened to and reciprocable with said piston assembly, the other said coolant transfer member being fastened to said frame structure, at least one of said coolant transfer members being located within the interior of said bore in the back cylinder head and thus said coolant is conducted through the interior of said bore in the back cylinder head on its way to the reciprocating piston assembly, said slide tube being isolated from the heat of said hot combustion gases by virtue of the fact that the coolant is conducted through the interior of said bore in the back cylinder head and (not through the hot gas environment of either working chamber,) and said packing gland being isolated from the pressure of said hot combustion gases by virtue of the fact that the coolant is conducted through the interior of said bore in the back cylinder head and (not through the hot gas environment of either working chamber.)

17. In a double acting two stroke cycle internal combustion engine, the combination of a crankcase, a crankshaft rotatably mounted in said crankcase, a working cylinder fastened to said crankcase, a front cylinder head and a back cylinder head fastened to said working cylinder, each cylinder head having a reduced diameter bore therein, a double acting working piston reciprocable in said working cylinder, a reduced diameter front valve piston and a reduced diameter back valve piston, said two valve pistons being attached to said working piston so as to form a reciprocating piston assembly, each valve piston being reciprocable in the bore of its respective cylinder head, a connecting rod interconnecting said working piston and said crankshaft, said connecting rod being connected to said working piston by means of a wrist pin, said working cylinder having exhaust ports located in its wall, said working piston being adapted to uncover said exhaust ports near the end of each reciprocative stroke, a scavenge pump for supplying scavenge air, a conduit for conducting scavenge air from said scavenge pump to the interior of said bore in the back cylinder head, said working cylinder having within it an annular front working cylinder and an annular back working chamber, said annular working chambers being bounded on their outer diameters by the working cylinder, said annular working chambers being bounded on their inner diameters by their respective valve pistons, said annular working chambers being bounded on their axial ends by said cylinder heads and said working piston, said valve pistons being adapted to momentarily withdraw from the bores in their respective cylinder heads near the end of a reciprocative stroke for the purpose of admitting scavenge air into their respective working chambers so as to scavenge the working chambers, each working chamber having a uniflow type scavenging operation exhausting through said exhaust ports, a partition member located partly inside said piston assembly and reciprocable therewith, said partition member surrounding part of said connecting rod, a seal structure reciprocable in said bore in the front cylinder head and having a sliding seal therein, fasteners fastening said seal structure to said front valve piston, said connecting rod having the usual small end (attached to the piston assembly) and large end (attached to the crankshaft) and shank portion (interconnecting said small and large ends), said partition member being wider near its front end so as to permit angular motion of said con rod within the partition member, means for lubricating said crankshaft with lube oil, said partition member and said seal structure serving to inhibit the intermixing of said scavenge air with lube oil thrown off of said crankshaft, wherein the improvement comprises: said front valve piston being adapted to withdraw from said bore in the front cylinder head during a portion of its reciprocative stroke, said partition member being separable and fastened along a longitudinal joint, said small end of the connecting rod being wider than said shank portion, the sides of said partition member being necked down so as to conform in proximity to the shank portion of said connecting rod such that it is necessary to separate said partition member (at said longitudinal joint) in order to install and remove said connecting rod from within the partition member, and a purpose of making the partition member separable being to permit said small end of the connecting rod (and the wrist pin bearing therein) to be larger, yet at the same time to permit the partition member to conform in proximity to said shank portion so as to maximize the flow area for the scavenge air as it flows through the interior of said front valve piston.

18. The combination recited in claim 17 wherein the said longitudinal joint in the partition member is a flanged joint, the outer edge of said flanged joint engages an inner surface of said front valve piston for the purpose of holding the front valve piston and the seal structure in coaxial alignment.

19. The combination recited in claim 17 wherein sheet metal vanes are attached to said partition member, said sheet metal vanes engage the end of (and the inner diameter of) said front valve piston so as to assist in holding said front valve piston and said seal structure in coaxial alignment.

20. The combination in a double acting two stroke cylinder internal combustion engine of a crankcase, a crankshaft rotatably mounted in said crankcase, a working cylinder fastened to said crankcase, a front cylinder head and a back cylinder head fastened to said working cylinder, each cylinder head having a reduced diameter bore therein, a double acting working piston reciprocable in said working cylinder, reduced diameter front and back valve pistons attached to said working piston so as to form a reciprocating piston assembly, each valve piston being reciprocable in the bore of its respective cylinder head, a connecting rod interconnecting said piston assembly and said crankshaft, said connecting rod being connected to said working piston by means of a wrist pin, means for supplying scavenge air, said working cylinder having within it annular front and back working chambers, each valve piston being adapted to admit scavenge air into its respective working chamber, said working cylinder having exhaust ports controlled by the working piston, said working chambers having uniflow type scavenging operations exhausting through said exhaust ports, a partition member located inside said piston assembly and reciprocable therewith, said partition member partly surrounding said connecting rod, a sliding seal structure reciprocable in said bore in the front cylinder head, said reciprocating piston assembly having a hollow interior, a portion of said scavenge air being conducted through the hollow interior of said piston assembly to said front working chamber, said crankshaft being lubricated with lube oil, said partiton member and seal structure serving to inhibit the intermixing of the scavenge air and lube oil thrown off said crankshaft, said working piston having two wrist pin bosses within its interior, each said boss having a bore therein so as to accommodate said wrist pin, each end of said wrist pin being located within one of said bosses with a rotative fit, wherein the improvement comprises: said partition member being inserted into said piston assembly and sealed with two static oil seals, each wrist pin boss having an end face made smooth so as to provide a smooth end surface to seal against, each said oil seal being located between said smooth end surface of a respective boss and said partition member, each said oil seal contacting and sealing against the said smooth end surface of its respective boss, each said oil seal also contacting and sealing against said partition member, said oil seals being of the static type since there is no rotative motion between said bosses and the partition member, said wrist pin having rotative motion relative to said working piston, means for lubricating said wrist pin with lube oil on its outer diameter at the two said locations where the wrist pin fits into the bosses with a rotative fit, and said oil seals serving to prevent the leakage of said lube oil from said outer diameter of the wrist pin to said hollow interior of the piston assembly.

21. The combination recited in claim 11 wherein said front valve piston and said seal structure are formed from an integral piece of metal, said front valve piston and said seal structure are interconnected by lands with inlet ports passing between the lands, and said scavenge air adapted to flow through said inlet ports on its way into said front working chamber.

22. The combination recited in claim 7 wherein a smaller sub groove is formed in the bottom of said ring groove, and said retaining ring is pressed radially inward into said sub groove to be held thereby.

* * * * *